US006617753B1

(12) United States Patent
Gomulka

(10) Patent No.: US 6,617,753 B1
(45) Date of Patent: Sep. 9, 2003

(54) VIBRATORY EXCITOR APPARATUS AND METHOD

(76) Inventor: Richard J. Gomulka, 12704 Calle Cereza, NE., Albuquerque, NM (US) 87111

( * ) Notice: Subject to any disclaimer, the term of this patent is extended or adjusted under 35 U.S.C. 154(b) by 0 days.

(21) Appl. No.: 10/062,471

(22) Filed: May 28, 2002

(51) Int. Cl.[7] .............................................. H01L 41/09
(52) U.S. Cl. ................................................... 310/316.01
(58) Field of Search ....................... 310/316.01, 316.02, 310/339

(56) References Cited

U.S. PATENT DOCUMENTS

| | | | |
|---|---|---|---|
| 3,101,420 A | * | 8/1963 | Hufferd et al. ............. 123/642 |
| 5,270,607 A | * | 12/1993 | Terajima ................ 310/316.01 |
| 5,509,198 A | * | 4/1996 | Takamizawa et al. ......... 29/898 |
| 5,525,853 A | * | 6/1996 | Nye et al. ............... 310/316.01 |
| 6,446,339 B2 | * | 9/2002 | Takamizawa et al. ......... 29/446 |

FOREIGN PATENT DOCUMENTS

JP          11-336829        * 12/1999    ............ F16F/15/02

* cited by examiner

*Primary Examiner*—Thomas M. Dougherty
(74) *Attorney, Agent, or Firm*—John P. Halvonik

(57) ABSTRACT

A control system and an apparatus using the control system. A controller monitors and adjusts the vibratory motion of the mechanical elements used in devices by means of transducers and other similar apparatuses. The present system is used to control machines that having two or more elements that come in contact with one another and operate them at their most efficient. The invention may find use in the field of automobiles and elevated trains used for mass transportation.

3 Claims, 1 Drawing Sheet

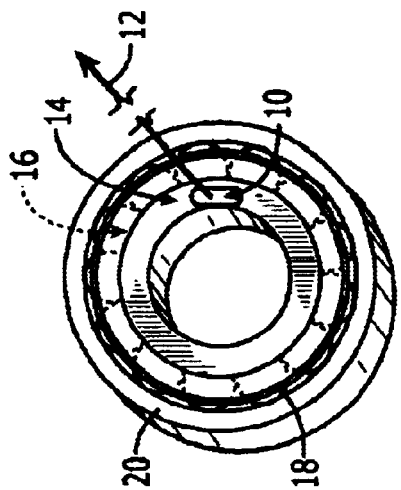
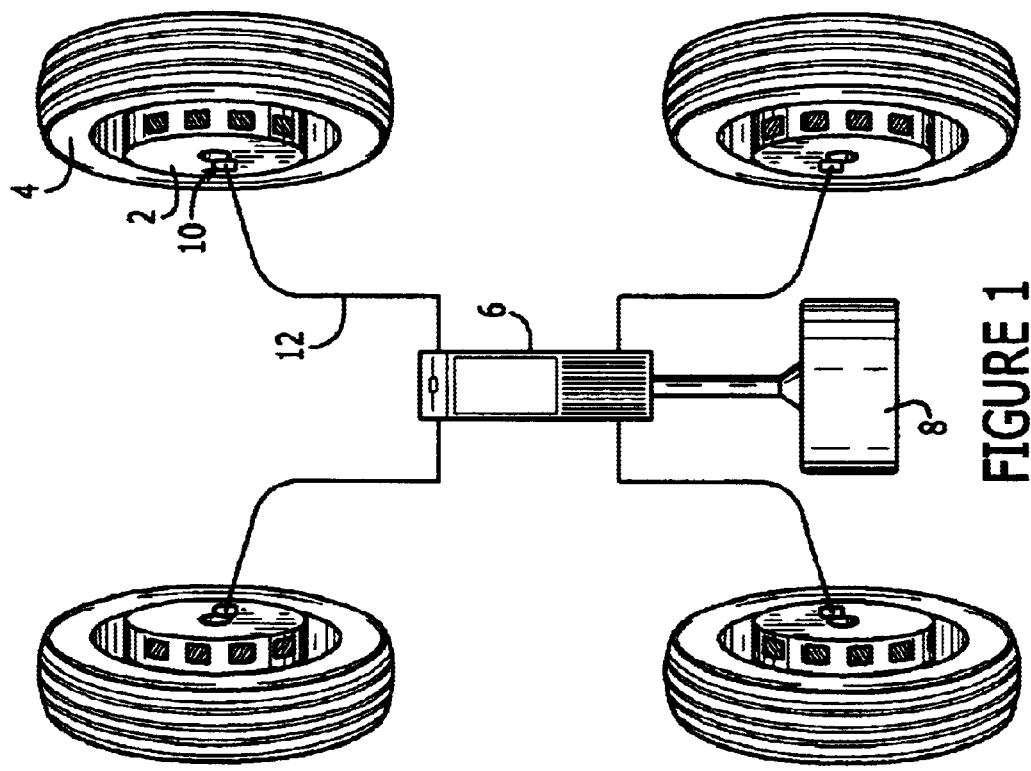

VIBRATORY EXCITOR APPARATUS AND METHOD

FIELD OF THE INVENTION

The invention relates to the field of friction reduction and positive feedback in the context of control systems for use in machines that have at least two working surfaces. Such control elements are used to send electrical impulses to control elements such as transducers, which impart vibratory motion to bearings and similar mechanical devices where there is a need to reduce friction between two working surfaces. The invention may be used to reduce friction in the axle wheel bearing system in automotive vehicles but is not limited to rotational devices.

The method includes a feedback control system for use in reducing the amount of friction between two surfaces as well as vastly changing the character of the movement of the two objects as they interact. The system does this by means of a device such as a transducer that will induce sympathetic vibrations in either one or both of the working surfaces.

The method is likely to find use in the field of automotive wheel bearings where a piezo electric transducer or a similar apparatus is used to vibrate each of the wheel bearings in a vehicle at a certain resonant frequency. This will reduce the effect of friction encountered among the wheel bearing and axle as well as improve performance of the automotive propulsion system in general.

BACKGROUND AND PRIOR ART

It is observed that when certain naturally occurring forces oppose one another in nature sometimes very unexpected results may occur. For example, if two tectonic plates collide with one another over a period of years, It has been observed that a few of the rocks generated from such collisions may wind up many miles away from where the collision took place. This would be many miles away from where the vast majority of rocks lie (say for example 95% of the rocks are within one mile of the collision zone). For example, if two tectonic plates collide with one another over a period of years, a small mountain would be formed having slopes littered with fragmentary rocks of many sizes and shapes. During the continual shaping of the earth's crust an avalanche occurs causing those rocks to tumble down the slope and coming to rest on a more level area. With our present methods of calculating mass, momentum and gravity, we could estimate where the majority of the rocks would come to rest. That is not always the case, however. A number of areas have shown those rocks have come to rest four to five times further than estimated. This is more or less an unexpected result.

It may be conjectured from such examples there may have occurred certain sympathetic vibrations that are set up in the rocks themselves as they tumble and then are reflected back, by the earth in what would be referred to as "tremors." The tremors would act as sympathetic vibrations, which would be positive feedback (or constructive interference) to the moving rocks. The positive feedback would cause them to move much further than we would expect if say, we were to measure the momentum of the falling rock at some point in its travel and by that method determine the final resting place of the stone.

In the present application an on-board computer or similar control device may be used in connection a vehicle propulsion system of an automotive or automotive type vehicle. The computer will send constantly changing frequencies of electronic signals to a number of transducers. Each of the transducers is in connection with a wheel of the vehicle. The computer will include sensing and monitoring equipment that will measure certain parameters of the axle and bearing of each wheel. Then, in turn, change the frequency sent to each transducer that is in connection with each wheel in order to maintain those parameters or else to find what parameters make the auto run most efficiently. It is believed that the friction encountered by such parts can be reduced by vibrating and providing positive feedback to those parts of the vehicle that encounter rotary motion throughout different operating speeds of the vehicle. It is believed that such a control system using transducer elements is novel and certainly non-obvious.

The controlling means will, through the use of sensors and a feedback loop, be constantly trying to send a sympathetic frequency to the working surface of the bearing, in this case. A sympathetic frequency is achieved when the feedback circuit indicates this area to be vibrating in resonance, or operating with the least friction. When resonance is reached, a form of positive feedback is introduced to the working surface, further reducing friction.

As resonance occurs with positive feedback, the engine will require the least amount of power to maintain the present speed of travel. The controller is constantly changing frequencies to each of the working surfaces maintaining resonance, and we believe fuel consumption will be reduced at almost any vehicle speed.

PRIOR ART

It is believed that the idea of imparting vibratory motion to mechanical elements is novel and non obvious. Such vibrations may impart certain characteristics to the elements such as bearings and axles, that can decrease the amount of friction experienced by the elements.

While there are transducers that have been used in the field of automobiles, there are none that have been used to regulate a system that is designed to reduce friction through the vibration of a wheel bearing that is in connection with the axle. None of the prior art uses transducers as a means to vibrate a bearing in order to reduce friction at the point of contact between the bearing and the axle.

SUMMARY OF THE INVENTION

A system for enhancing the performance of machines that have an interface between at least two working surfaces. Included would be rotating elements found in wheeled vehicles where a bearing or similar device secures a rotating axle. The invention includes a controller means, such as an on-board computer, that imparts certain vibratory motion to, in this case, the rotating elements in the system. In the invention, control signals are sent from the controller to at least one of the parts in the system.

The controller means may vary the vibrating frequency of the transducer in order to control vibratory motion applied to at least one of the elements in such a system. There are sensors in connection with the controller that will report back certain operating parameters of the automobile (or any unit with at least two working surfaces) and the controller will monitor these feedback loops for specific values. The controller means will either raise or lower the frequency to the transducer until the loop back circuit returns a specific value. When a specific value from the loop back circuit is reached, the unit will be operating at the most efficient level.

The transducer device may be used to vibrate the working surface or bearings in wheeled vehicles. There will be, preferably, one transducer for each axle bearing in the vehicle. In the case of a long flat working surface, many transducers, appropriately spaced, would be used to produce the vibratory motion desired.

The transducer will control the bearings in such a manner as to impart vibratory motion to the element. Such motion may have a frequency and amplitude characteristic to it. And such characteristic may be measured and recorded by the controller element of the system. The controller element will vary the signal sent to the transducer until a specific value is returned to the controller via the loop back circuit.

It is among the objects of the invention to establish the method of reducing friction between two working surfaces by vibrating one or both surfaces. An electronic controlling unit may impart analog or digital signals to a transducer device that converts electrical impulses to mechanical vibration. The amplitude and frequency of these electrical impulses will be constantly changing until a specific value is returned to the controller via the loop back circuit.

Other objectives of the invention will be readily apparent to those skilled in the art once the invention has been described.

DESCRIPTION OF THE FIGURES

FIG. 1 Overall schematic of the system showing in this case, tires, a controller unit; and transducers associated with each bearing.

FIG. 2 shows detail of the bearing and transducer assembly.

DESCRIPTION OF THE PREFERRED EMBODIMENT

The invention comprises a system and an apparatus for imparting vibrational motion to machine elements that come into contact with one another in order to vibrate such elements at an optimal frequency. The system is designed to enhance the performance of machine such as vehicles by reducing friction between any two surfaces that come in contact with one another. The invention is not limited to vehicles but may find usage in any case where two surfaces are in contact with one another and there is friction involved.

FIG. 1 shows an overall depiction of a such a system for a powered vehicle; showing the use of a piezoelectric transducer 10 in connection with the bearing (14, 16, 18, 20 and associated parts) that is in connection with each wheel. There are transducers in connection with each of the wheels (shown as 4). Each transducer is individually wired (through wire 12) to and controlled by the computer 6 that is used on board the vehicle.

The control computer may be referred to as the "exciter" computer. Initially, the controller elements sends a predetermined frequency of electric current to all transducers that are in connection with the bearings of the automobile. The transducers used in the invention are piezoelectric transducers that have the ability to expand and contract in a certain direction upon the application of an electric current or signal.

The higher the frequency of the electronic signal, the faster the transducer can be made to expand and contract. The transducer 10 is then in connection with the wheel bearings 16. This expansion and contraction will be transferred to the bearings causing it to vibrate at the same frequency as the frequency of the expansion/contraction of the transducer.

Transducers are preferred as the mechanical unit of choice to vibrate the bearings in the invention. In this case, the use of transducers refers generally to those devices that will impart a vibrating motion to a bearing or similar apparatus of the wheeled vehicle in response to electric signals that the transducer is receiving from a controlling device. Such transducers that are used in the invention are likely to be quite small and made of ceramic material. They only need to be large enough to attach to the inner ring of the bearing.

The vibration of the bearing will in turn create "rolling vibrations" which, for purposes of this invention, are considered to be a sympathetic vibration that occurs in the axle or shaft (or other element that is in connection with the bearing) in response to the vibration of the bearing. Of course, when the invention is used in other applications, sympathetic vibrations can be created between any two working surfaces.

The sympathetic vibration is a form of positive feedback that will occur in the element that is in connection with the bearing and this vibration will create a better efficiency in the performance of the machine, which might be an automobile or other machine where friction can retard efficiency.

The controlling means in the invention is likely to be a computer or some other such device that can measure certain parameters of the performance of the vehicle and/or the bearings in order to send certain response signals to the transducer in turn. A feedback loop may be used to good effect in connection with the controller. Such a loop may include a sensor that records certain vehicle parameters at any given time and then can vary the vibrating characteristic of the bearing in response to these recordings of vehicle parameters that the sensor is receiving.

Such response signals then, will vary the vibrational frequency of the bearing as certain parameters of the vehicle change during the ride. In this manner, the controlling device can maintain the most effective form of decreased friction at the interface between the bearing and the axle or similar type of apparatus that two working surfaces. Generally, it is thought that such parameters would include the speed of the vehicle as measured against the rate of fuel consumption.

As the automobile or other wheeled device begins to move, a computer will constantly monitor the performance of the vehicle engine and adjusts the vibrational frequency of each bearing (by varying the control signal) in order to minimize rolling resistance and thus maximizing engine performance. This can be by an engine monitor 8 that is separate from the computer controller. The computer will continue to vary the controlling signal until it is determined that an optimal performance is occurring in the machine.

The optimal performance may be a set of parameters that is measured by any number of standards that may be judged by the manufacturer. Optimal performance may be defined by the manufacturer at the manufacturing stage.

In order to maintain the machine at its highest levels of efficiency, the controlling computer is constantly changing the frequencies to each controlling element in the system because of many constantly changing conditions that would include speed, temperature and normally occurring vibrations.

These mechanical devices, such as transducers, that control the bearings, should be able to produce a mechanical vibrating force on the bearing or any two working surfaces in response to electrical voltages being applied by a control element. Such a control signal should then be able to vary the frequency of vibration of the bearing and the axle in turn since the axle is in a mechanical connection with the bearing.

Feedback responsive means may be used in connection with the control mechanism (this is most likely an on board computer that records system parameters of the engine, frequency of vibration of the machine parts, history of the control signal, etc.) to facilitate the controlling process. Such feedback control might for example, use state of the art means to gather information such as engine performance and/or performance of the wheels themselves at various engine speeds or various vehicle speeds.

Such signals will be evaluated by the controller computer as a sign of engine/vehicle performance. Such performance will then determine whether the vibrational characteristics of the bearing need to be changed in order to optimize the friction encountered by these elements and/or optimize the efficiency of the machine. The optimum signal frequency is likely to vary for each type of automobile, type of bearing, and the speed. Such optimum frequencies will be determined by the computer on an as needed basis.

I claim:

1. A system for controlling bearings in wheeled vehicles having an engine and propulsion system for converting rotary motion from the engine to the rotating axles of the vehicle; said system comprising: a controller and at least one bearing adapted for supporting a rotating element, at least one axle in mechanical connection with said bearing; said controller in electromagnetic connection with a means for vibrating said bearing at various frequencies of vibration, and said controller having a means for collecting information regarding the performance of the engine at various operating speeds of the engine, and said controller having a means for sending electronmagnetic control signals to said means for vibrating, said means for vibrating in mechanical connection with said bearing, said controller having a means to monitor and record the engine performance at various operating parameters including said frequencies of vibration; said controller having a means for varying said electromagnetic control signals in response to changes in the engine performance.

2. The system of claim 1 wherein said means to monitor and record the engine performance comprises a computer.

3. The system of claim 2 where said means for vibrating comprises a piezo electronic device.

* * * * *